No. 790,393. PATENTED MAY 23, 1905.
E. F. PRICE.
PROCESS OF SMELTING IRON ORES AND PRODUCING FERROCHROMIUM.
APPLICATION FILED OCT. 19, 1904.
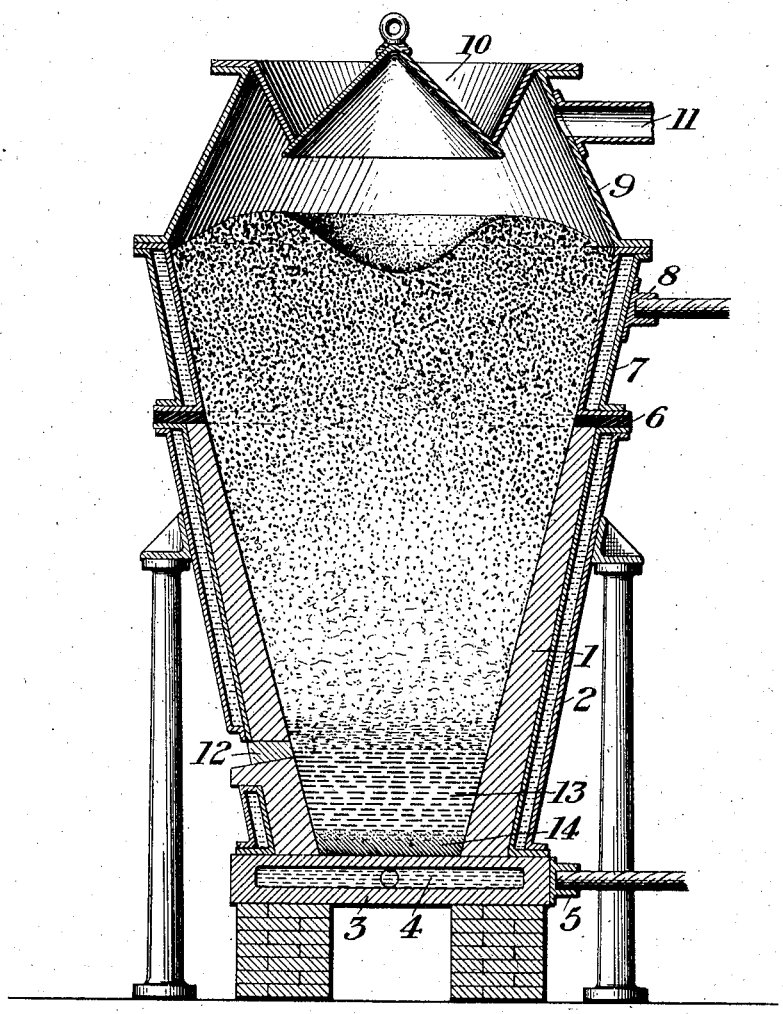
Witnesses:
R. A. Balderson
J. B. Hill
Inventor:
Edgar F. Price,
by Byrnes & Townsend,
Att'ys.

No. 790,393.

Patented May 23, 1905.

UNITED STATES PATENT OFFICE.

EDGAR F. PRICE, OF NIAGARA FALLS, NEW YORK.

PROCESS OF SMELTING IRON ORES AND PRODUCING FERROCHROMIUM.

SPECIFICATION forming part of Letters Patent No. 790,393, dated May 23, 1905.

Application filed October 19, 1904. Serial No. 229,167.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Iron Ores and Producing Ferrochromium, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. As the ore is reduced a layer of the ferrochromium accumulates on the hearth, covered by a layer of slag. The molten alloy is tapped out from time to time until the slag has increased to such an amount as to require removal. As the normal slag has a high fusion-point, a flux is added to render it more liquid, and the remaining alloy and slag are finally run out through the metal tap-hole. The furnace is then charged anew and the process is repeated.

It is important that the ferrochromium produced should be low in carbon. The amount of carbon in the charge is therefore kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace under the high applied potential. Much heat is therefore lost by radiation from the zone of reduction through the charge, while the electrode is insufficiently protected from oxidation by the air. This loss of heat greatly decreases the reduction efficiency of the furnace Furthermore, the slag is not kept at a sufficiently high temperature to permit it to be tapped out except by adding large amounts of flux, discontinuing the charging of ore, and employing the energy of the arc merely to liquefy the slag. The heat losses are also increased by the discontinuous mode of working, both the furnace and the depending electrode cooling down when the furnace is emptied.

According to the present invention the reduction of chromite, magnetite, and other ores of iron is effected in an incandescence-furnace by a continuous operation, the charge and its products being employed as a resistance-conductor. The construction of the furnace and the arrangement of the terminal electrodes is preferably such that the density of the current increases through the charge from the point where it is introduced into the furnace to the point of reduction, thereby gradually raising the temperature of the charge. The terminal electrodes are preferably of iron and they are maintained at a relatively low temperature by the use of a cooling medium. The preferred furnace is a downwardly-converging vertical stack, one of the electrodes being a water-jacketed horizontal iron ring at the upper end of the furnace and the lower electrode comprising a water-cooled horizontal iron plate, constituting the hearth of the furnace, and a body of the iron or alloy produced by the reduction of the ore and supported by the hearth-plate, this body being in a molten condition except at its lower end, where it is maintained in a pasty or solid condition by the cooling action of water circulated through the hearth. Iron or an iron alloy containing a minimum or definite percentage of carbon may be produced by employing a charge containing a predetermined amount of carbon.

A suitable electric furnace is shown in the accompanying drawing, in which the figure is a vertical axial section.

The furnace is a vertical stack comprising a downwardly-converging body 1 of refractory non-conductive material, such as magnesia or siloxicon fire-brick, surrounded by a water-jacket 2. The body is supported upon a horizontal metal plate 3, preferably of cast-steel, having a chamber 4 for the circulation of water and an electric terminal 5. A body 13 of a molten metal or alloy is supported on the plate 3, this body and plate constituting the lower electrode of the furnace. Supported upon the body 1, but insulated therefrom by a layer 6 of refractory non-conductive material, is the upper electrode 7, a downwardly-converging water-jacketed iron ring having a terminal 8, the inner surface of the ring being bare, so that it may contact with the charge. Supported upon the electrode-ring 7 is an iron ring 9, which carries a bell-and-hopper charging mechanism 10. An outlet-flue 11 for waste gases extends from the ring 9. A tap-hole 12 for the molten product extends laterally through the body 1 at some distance above the hearth-electrode. In employing this furnace to carry out the process a charge which is electrically conductive or which will be converted into a conductor by the temperature of the furnace—for example, a mixture of chromite, coke, lime, and silica—is fed into the furnace until it substantially fills the stack, the upper portion of the charge lying in contact with the ring-electrode 7. If the charge is normally a poor conductor, initial-current paths between the electrodes are provided. The conductivity of the charge may be increased by using a mixture containing large pieces of coke, which lie in contact with each other at various points, and thereby afford direct paths for the flow of current. An electric current is then passed from the upper electrode through the charge to the hearth, the charge serving as a resistance-conductor, in which the temperature gradually rises toward the hearth by reason of the decreasing cross-section and increasing current density to a point where reduction is effected. The reduced iron and chromium form a molten alloy, which accumulates in a body 13 in the lower part of the stack below the tap-hole 12, this body being molten except for a layer 14 in proximity to the hearth, which is maintained in a pasty or solid condition by water circulated through the chamber 4 of the hearth. During the normal operation of the furnace the body 13 serves as the lower electrode, the hearth 3 then constituting merely a terminal electrode. Further reduction of the charge causes the accumulated body to rise above the level of the tap-hole 12, and the excess is tapped out from time to time or continuously, fresh charge material being fed into the furnace at the top. The process is thus a continuous one. The waste gases passing up from the zone of reduction through the charge serve to preheat it and are withdrawn through the flue 11 and utilized for fuel.

By employing a charge containing a predetermined amount of carbon it is possible to produce iron or an iron alloy containing a minimum or definite percentage of carbon.

The use of electrodes of iron, and especially of an iron electrode in contact with the molten iron reduced from the charge, is a decided improvement over the use of electrodes of carbon, which would dissolve in the product and give it a high and variable percentage of carbon.

The claims of this application are specifically directed to the reduction of iron ores, the reduction of refractory ores in general, and specifically the reduction of calcium compounds for the production of calcium carbid, being claimed in my Patent No. 782,922, dated February 21, 1905.

I claim—

1. The process of smelting ores containing iron, which consists in interposing a charge of the ore and a reducing agent as a resistance-conductor between metal electrodes, electrically heating said charge to the temperature requisite for reduction, and cooling the electrodes to maintain them at a relatively low temperature, as set forth.

2. The process of smelting ores containing iron, which consists in interposing a charge of the ore and a reducing agent as a resistance-conductor between electrodes, one of said electrodes being of iron or an iron alloy and comprising a liquid portion and a solid portion, electrically heating said charge to the temperature requisite for reduction, and cooling the solid portion of said metal electrode, as set forth.

3. The process of smelting ores containing iron, which consists in interposing a charge of the ore and a reducing agent as a resistance-conductor between superposed electrodes, the lower electrode being of iron or an iron alloy and comprising a liquid portion and a solid portion, electrically heating said charge to the temperature requisite for reduction, and cooling the solid portion of the lower electrode, as set forth.

4. The process of smelting ores containing iron, which consists in interposing a charge of the ore and a reducing agent as a resistance-conductor between superposed electrodes, the lower electrode being of iron or an iron alloy and comprising a liquid portion and a solid portion, electrically heating said charge to the temperature requisite for reduction, cooling the solid portion of the lower electrode, permitting the molten product to settle and collect upon the lower electrode, and removing the product and supplying fresh charge materials as required, as set forth.

5. The process of smelting ores containing iron, which consists in interposing a charge of the ore and a reducing agent as a resistance-conductor between metal electrodes, electrically heating said charge to the temperature requisite for reduction by an electric current the density of which increases through the charge, and cooling the electrodes to maintain them at a relatively low temperature, as set forth.

6. The process of smelting ores containing iron, which consists in interposing a charge of the ore and a reducing agent as a resistance-conductor between electrodes, one of said electrodes being of iron or an iron alloy and comprising a liquid portion and a solid portion, electrically heating said charge to the temperature requisite for reduction by an electric current the density of which increases through the charge, and cooling the solid portion of said metal electrode, as set forth.

7. The process of smelting ores containing iron, which consists in interposing a charge of the ore and a reducing agent as a resistance-conductor between superposed electrodes, the lower electrode being of iron or an iron alloy and comprising a liquid portion and a solid portion, electrically heating said charge to the temperature requisite for reduction by an electric current the density of which increases through the charge, cooling the solid portion of the lower electrode, permitting the molten product to settle and collect upon the lower electrode, and removing the product and supplying fresh charge materials as required, as set forth.

8. The process of smelting ores containing iron and an alloying metal, which consists in interposing a charge of the ore and a reducing agent as a resistance-conductor between metal electrodes, electrically heating said charge to the temperature requisite for reduction, and cooling the electrodes to maintain them at a relatively low temperature, as set forth.

9. The process of smelting ores containing iron and an alloying metal and producing an alloy containing a minimum or definite percentage of carbon, which consists in interposing a charge of the ore and a predetermined amount of carbon as a resistance-conductor between metal electrodes, electrically heating said charge to the temperature requisite for reduction, and cooling the electrodes to maintain them at a relatively low temperature, as set forth.

10. The process of smelting ores containing iron and an alloying metal and producing an alloy containing a minimum or definite percentage of carbon which consists in interposing a charge of the ore and a predetermined amount of carbon as a resistance-conductor between electrodes, one of said electrodes consisting of the alloy to be produced and comprising a liquid portion and a solid portion, electrically heating said charge to the temperature requisite for reduction, and cooling the solid portion of said alloy electrode, as set forth.

11. The process of smelting ores containing iron and an alloying metal and producing an alloy containing a minimum or definite percentage of carbon, which consists in interposing a charge of the ore and a predetermined amount of carbon as a resistance-conductor between superposed electrodes, the lower electrode consisting of the alloy to be produced and comprising a liquid portion and a solid portion, electrically heating said charge to the temperature requisite for reduction, cooling the solid portion of said alloy electrode, permitting the molten product to settle and collect upon the lower electrode, and removing the product and supplying fresh charge materials as required, as set forth.

12. The process of smelting ores containing iron and an alloying metal and producing an alloy containing a minimum or definite percentage of carbon, which consists in interposing a charge of the ore and a predetermined amount of carbon as a resistance-conductor between metal electrodes, electrically heating said charge to the temperature requisite for reduction by an electric current the density of which increases through the charge, and cooling the electrodes to maintain them at a relatively low temperature, as set forth.

13. The process of smelting ores containing iron and an alloying metal and producing an alloy containing a minimum or definite percentage of carbon, which consists in interposing a charge of the ore and a predetermined amount of carbon as a resistance-conductor between superposed electrodes, the lower electrode consisting of the alloy to be produced and comprising a liquid portion and a solid portion, electrically heating said charge to the temperature requisite for reduction by an electric current the density of which increases through the charge, cooling the solid portion of said alloy electrode, permitting the molten product to settle and collect upon the lower electrode, and removing the product and supplying fresh charge materials as required, as set forth.

14. The process of smelting chromite and producing ferrochromium, which consists in interposing a charge of the chromite and a reducing agent as a resistance-conductor between metal electrodes, electrically heating said charge to the temperature requisite for reduction, and cooling the electrodes to maintain them at a relatively low temperature, as set forth.

15. The process of smelting chromite and producing ferrochromium containing a minimum or definite percentage of carbon, which consists in interposing a charge of the chromite and a predetermined amount of carbon as a resistance-conductor between metal electrodes, electrically heating said charge to the temperature requisite for reduction, and cooling the electrodes to maintain them at a relatively low temperature, as set forth.

16. The process of smelting chromite and producing ferrochromium containing a minimum or definite percentage of carbon, which consists in interposing a charge of chromite and a predetermined amount of carbon as a resistance-conductor between superposed electrodes, the lower electrodes consisting of ferrochromium and comprising a liquid portion and a solid portion, electrically heating said charge to the temperature requisite for reduction, cooling the solid portion of the lower electrode, permitting the molten product to settle and collect upon the lower electrode, and removing the product and supplying fresh charge materials as required, as set forth.

17. The process of smelting chromite and producing ferrochromium containing a minimum or definite percentage of carbon, which consists in interposing a charge of the chromite and a predetermined amount of carbon as a resistance-conductor between metal electrodes, electrically heating said charge to the temperature requisite for reduction by an electric current the density of which increases through the charge, and cooling the electrodes to maintain them at a relatively low temperature, as set forth.

18. The process of smelting chromite and producing ferrochromium containing a minimum or definite percentage of carbon, which consists in interposing a charge of chromite and a predetermined amount of carbon as a resistance-conductor between superposed electrodes, the lower electrode consisting of ferrochromium and comprising a liquid portion and a solid portion, electrically heating said charge to the temperature requisite for reduction by an electric current the density of which increases through the charge, cooling the solid portion of the lower electrode, permitting the molten product to settle and collect upon the lower electrode, and removing the product and supplying fresh charge materials as required, as set forth.

In testimony whereof I affix my signature in presence of two witnesses.

EDGAR F. PRICE.

Witnesses:
G. E. COX,
JAMES G. MARSHALL.